(12) United States Patent
Lin

(10) Patent No.: US 10,174,883 B1
(45) Date of Patent: Jan. 8, 2019

(54) GAS REGULATOR WITH A GAS-AMOUNT DISPLAY ASSEMBLY

(71) Applicant: Te Feng Lin, Taipei (TW)

(72) Inventor: Te Feng Lin, Taipei (TW)

( * ) Notice: Subject to any disclaimer, the term of this patent is extended or adjusted under 35 U.S.C. 154(b) by 88 days.

(21) Appl. No.: 15/631,720

(22) Filed: Jun. 23, 2017

(51) Int. Cl.
*F17C 13/02* (2006.01)
*G01F 23/00* (2006.01)

(52) U.S. Cl.
CPC .............. *F17C 13/02* (2013.01); *G01F 23/00* (2013.01); *F17C 2223/0123* (2013.01); *F17C 2250/0408* (2013.01)

(58) Field of Classification Search
CPC ...... F16K 37/005; F16K 15/145; F16K 37/00; F16K 15/14; F17C 13/02; F17C 2223/0123; F17C 2250/0408; G01F 23/00
See application file for complete search history.

(56) References Cited

U.S. PATENT DOCUMENTS

| | | | | |
|---|---|---|---|---|
| 4,921,008 | A * | 5/1990 | Foster | F16K 17/285 137/460 |
| 6,223,769 | B1 | 5/2001 | Bragg | |
| 2004/0211462 | A1 * | 10/2004 | Chen | F16K 37/0091 137/39 |
| 2006/0076063 | A1 * | 4/2006 | Perry | F02M 25/0836 137/554 |
| 2006/0272710 | A1 * | 12/2006 | Minervini | F16K 37/0033 137/487.5 |
| 2007/0204673 | A1 * | 9/2007 | Bailey | G01N 30/88 73/23.42 |
| 2008/0163936 | A1 * | 7/2008 | Boger | F15B 5/006 137/455 |
| 2011/0088794 | A1 | 4/2011 | Cavagna | |
| 2011/0284781 | A1 * | 11/2011 | Keller | F02M 25/0836 251/129.15 |
| 2015/0107710 | A1 * | 4/2015 | Huang | F16K 37/005 137/859 |

FOREIGN PATENT DOCUMENTS

CN 204754976 U * 11/2015

OTHER PUBLICATIONS

Search report, EPO application No. 17176433.5-1802, Dec. 18, 2017.

* cited by examiner

*Primary Examiner* — Francis C Gray
(74) *Attorney, Agent, or Firm* — Shimokaji IP

(57) ABSTRACT

A gas regulator with a gas-amount display assembly is capable of showing an amount of gas in a gas storage device connected to the gas regulator, and the gas regulator includes a regulating assembly, a detecting assembly, and a display assembly. The detecting assembly has a touch switch and an abutting component selectively abutting the touch switch. The display assembly and the detecting assembly are separated from each other. The display assembly changes its display state according to whether the abutting component abuts the touch switch or not. With the detecting assembly and display assembly separated from each other, the regulating assembly and the detecting assembly can be disposed with the gas storage device at a safe position, and the display assembly may be disposed at a position that can be observed easily. Thus, the user can check the amount of the gas at any time.

18 Claims, 6 Drawing Sheets

GAS REGULATOR WITH A GAS-AMOUNT DISPLAY ASSEMBLY

BACKGROUND OF THE INVENTION

1. Field of the Invention

The present invention relates to a regulator, especially to a regulator for a gas storage device with a gas-amount display assembly.

2. Description of the Prior Arts

To increase storage capacity, gas in a gas storage device is compressed with high pressure. Therefore, a regulator has to be mounted on the gas storage device, which regulates the gas provided by the gas storage device to an appropriate pressure. In addition, the gas in the gas storage device may be exhausted during use. Thus, the conventional gas regulator is provided with a display assembly. The display assembly shows a color when the pressure in the gas storage device is high and shows another color when the pressure in the gas storage device is lower than a pre-determined pressure and thereby a user can check the amount of the gas in the gas storage device.

The conventional display assembly is mounted on the conventional regulator, so the user has to move to the place where the gas storage device is disposed when the user wants to check the amount of the gas. However, in a camping car, the gas storage device with the conventional regulator may be disposed at a position that may not obstruct the user's movements. In other words, under most circumstances, the gas storage device and the conventional regulator may not appear within the sight of the user so that it is really inconvenient for checking the amount of the gas in the gas storage device.

To overcome the shortcomings, the present invention provides a gas regulator with a gas-amount display assembly to mitigate or obviate the aforementioned problems.

SUMMARY OF THE INVENTION

The main objective of the present invention is to provide a gas regulator with a gas-amount display assembly that is easy for checking an amount of gas in a connected gas storage device.

The gas regulator is capable of being connected to at least one gas storage device, and the gas regulator comprises a regulating assembly, a detecting assembly, and a display assembly. The regulating assembly comprises a first regulating chamber communicating with the at least one gas storage device to regulate pressure provided by the at least one gas storage device. The detecting assembly comprises a shell, an isolating sleeve, a circuit board, a touch switch, an abutting component, and a first elastic component. One end of the shell is securely mounted on the regulating assembly and communicates with the first regulating chamber. The isolating sleeve seals between the end of the shell and the regulating assembly. The circuit board is disposed in the shell. The touch switch is disposed in the shell and connected to the circuit board. The abutting component is disposed in the shell and between the isolating sleeve and the touch switch; the abutting component abuts the isolating sleeve and selectively abuts the touch switch. The first elastic component is disposed in the shell and connected to the abutting component and thereby the abutting component tends to be away from the touch switch. The display assembly disposed is apart from the detecting assembly, is electrically connected to the detecting assembly wirelessly or by a cable, and is capable of showing an amount of gas in the at least one gas storage device. The display assembly changes a display state according to whether the abutting component abuts the touch switch or not.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
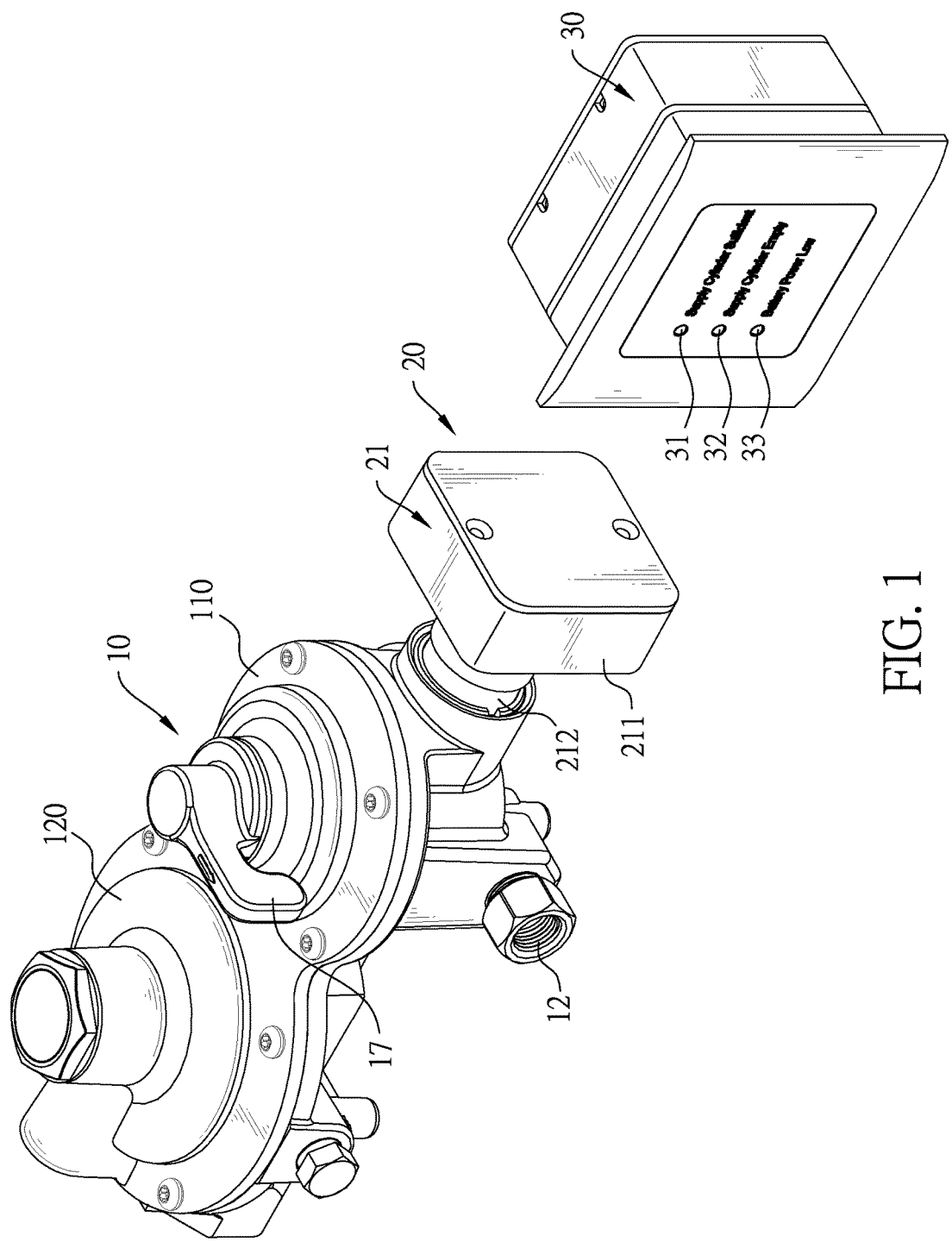
FIG. 1 is a perspective view of a gas regulator with a gas-amount display assembly in accordance with the present invention.

With reference to FIG. 1, a gas regulator with a gas-amount display assembly in accordance with the present invention capable of being connected to at least one gas storage device is provided. The gas regulator comprises a regulating assembly 10, a detecting assembly 20, and a display assembly 30.

The regulating assembly 10 comprises a first regulating chamber 110 and a second regulating chamber 120. The at least one gas storage device (not illustrated in the drawings) communicates with one end of the first regulating chamber 110, and the second regulating chamber 120 communicates with another end of the first regulating chamber 110. Furthermore, the second regulating chamber 120 communicates with a gas stove. Therefore, the first regulating chamber 110 and the second regulating chamber 120 are capable of regulating the pressure at two stages so that the pressure of gas provided by the gas storage device to the gas stove is appropriate. In another embodiment, the regulating assembly 10 may comprise the first regulating chamber 110 only.

Figure 2:
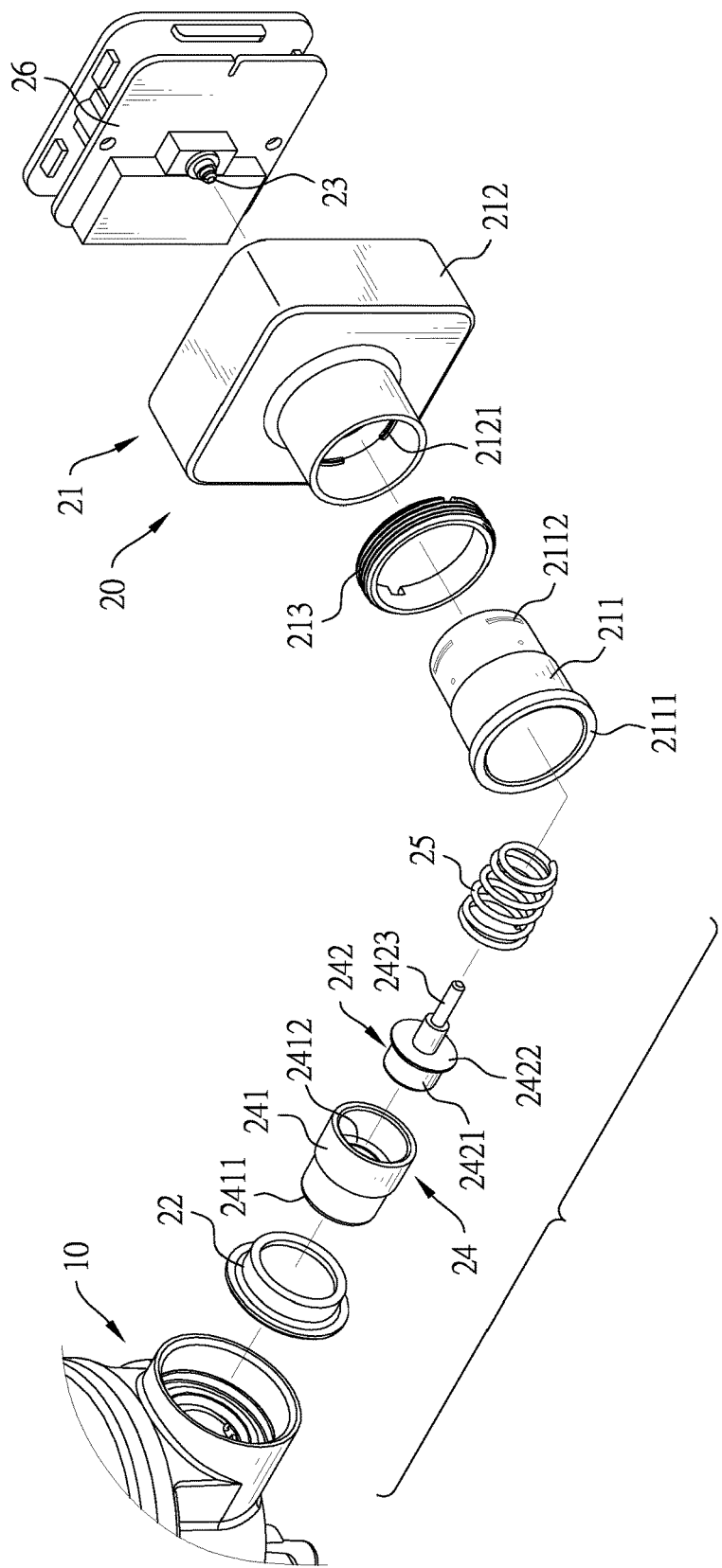
FIG. 2 is an exploded view of a detecting assembly of the gas regulator in FIG. 1.
Figure 3:
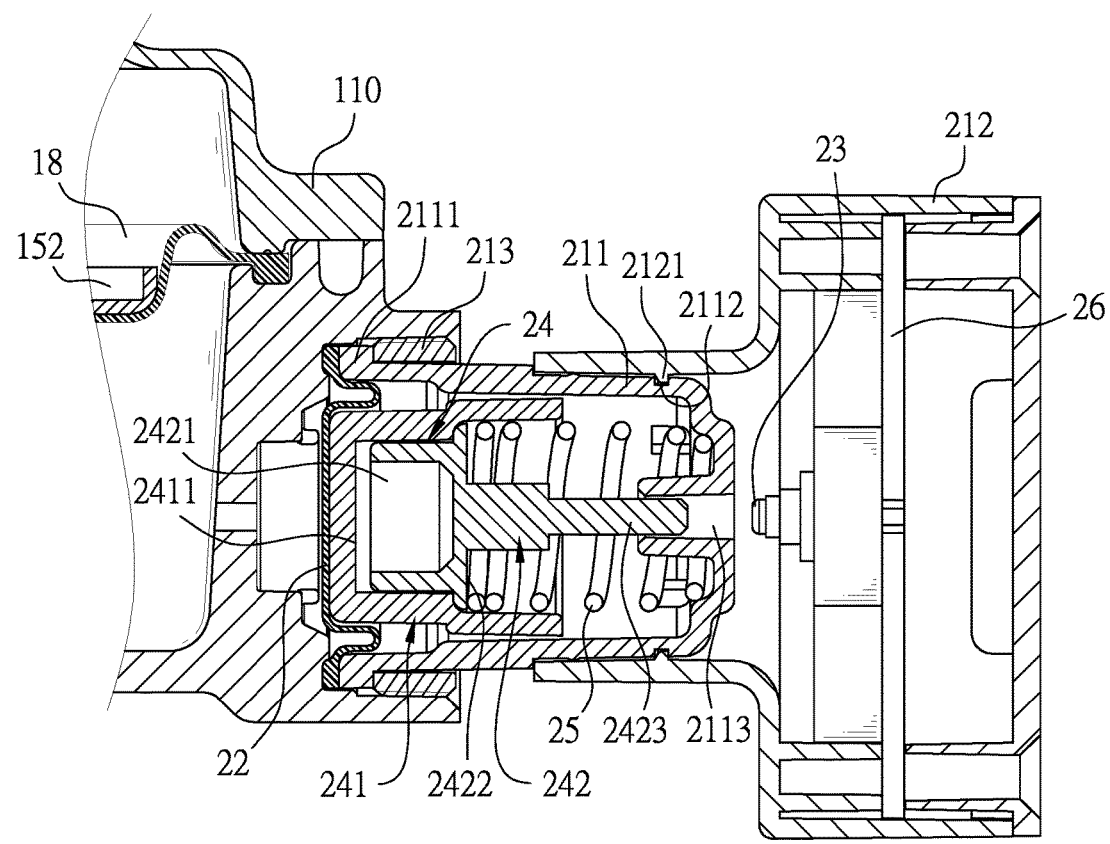
FIG. 3 is a sectional view of the detecting assembly of the gas regulator in FIG. 1.

Then please also refer to FIGS. 2 and 3. The detecting assembly 20 comprises a shell 21, an isolating sleeve 22, a touch switch 23, an abutting component 24, a first elastic component 25, and a circuit board 26.

One end of the shell 21 is mounted on the regulating assembly 10 and communicates with the first regulating chamber 110. In this embodiment, the first regulating chamber 110 comprises a communicating hole 1100 and the shell 21 comprises a first shell body 211, a second shell body 212, and an engaging ring 213. The first shell body 211 comprises a first end and a second end opposite each other. The first end of the first shell body 211 is securely mounted on the regulating assembly 10 and communicates with the first regulating chamber 110 through the communicating hole 1100. The isolating sleeve 22 seals the first end of the first shell body 211, so gas in the first regulating chamber 110 only can flow through the communicating hole 1100 to the first end of the first shell body 211 but is obstructed by the isolating sleeve 22 and may not flow into the first shell body 211 further. The second shell body 212 and the first shell body 211 are sleeved with each other. In this embodiment, the second shell body 212 is sleeved on the first shell body 211, but, in another embodiment, the first shell body 211 is sleeved on the second shell body 212.

Specifically, the first shell body 211 comprises a first end and a second end opposite each other, and a flange 2111. The first end of the first shell body 211 is mounted in the first regulating chamber 110. The flange 2111 is disposed in the first regulating chamber 110. The engaging ring 213 is sleeved on the first end of the first shell body 211 and abuts both the flange 2111 and an inner surface of the first regulating chamber 110 so that the first shell body 211 and the first regulating chamber 110 are fixed to each other. On the contrary, the second end of the first shell body 211 comprises a plurality of grooves 2112. The grooves 2112 are formed on an outer surface of the first shell body 211 and are arranged annularly. The second shell body 212 comprises a plurality of ribs 2121. The ribs 2121 are formed on an inner surface of the second shell body 212, are arranged annularly, and correspond to the grooves 2112 respectively in position. Thus, each one of the ribs 2121 is capable of engaging in a respective one of the grooves 2112, which makes the first shell body 211 and the second shell body 212 fix to each other.

The abutting component 24 and the first elastic component 25 are disposed in the first shell body 211, and the touch switch 23 and the circuit board 26 are disposed in the second shell body 212. The abutting component 24 is between the isolating sleeve 22 and the touch switch 23, selectively extends out of the first shell body 211, and selectively abuts the touch switch 23. The touch switch 23 and the circuit board 26 are electrically connected.

Figure 4:
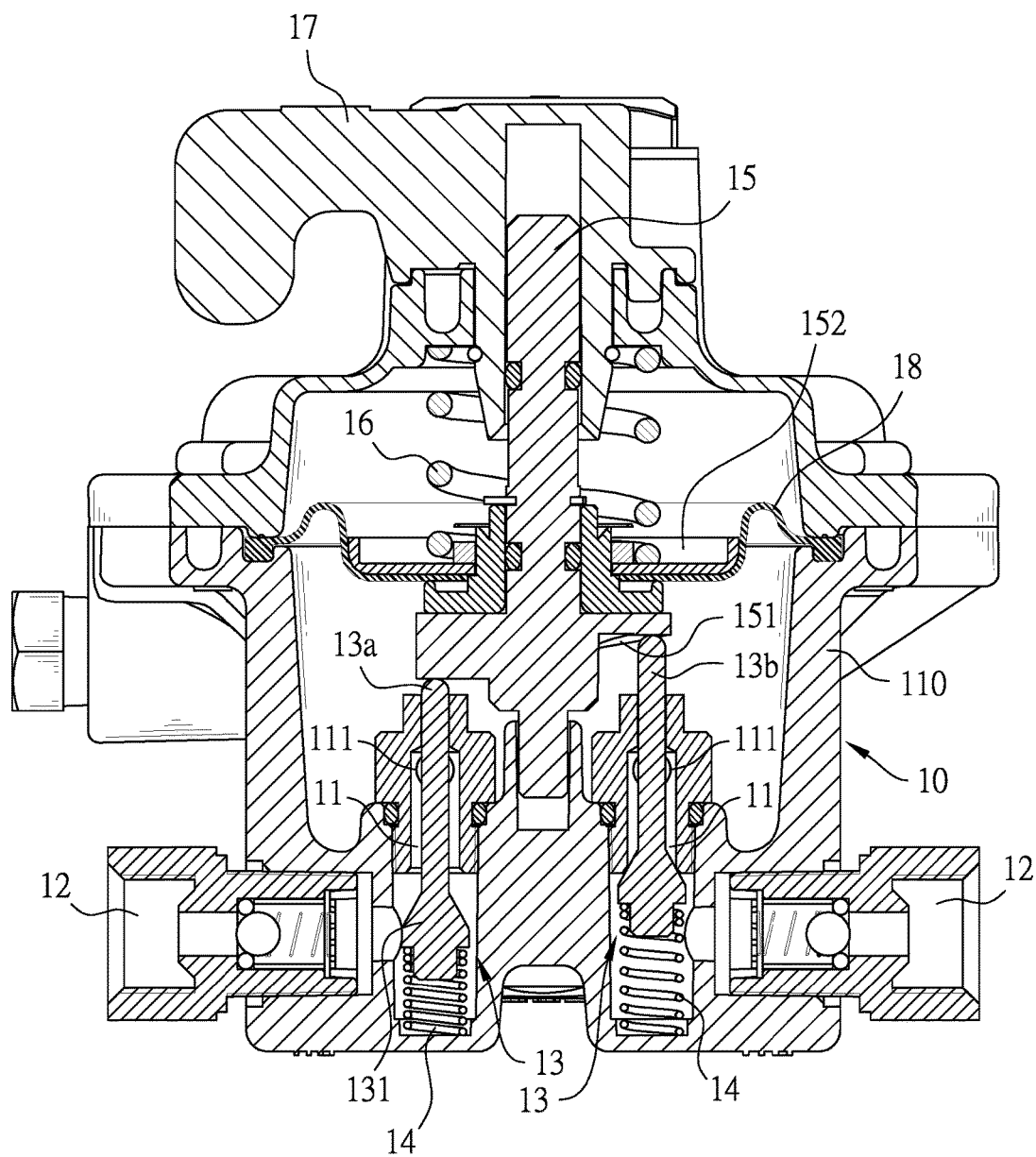
FIG. 4 is a sectional view of a regulating chamber of the gas regulator in FIG. 1.

In this embodiment, the abutting component 24 comprises a bushing 241 and a blocker 242. The bushing 241 is a hollow cylinder and comprises a plane portion 2411 which closes one end of the hollow cylinder. The plane portion 2411 abuts the isolating sleeve 22 so that a contact area of the abutting component 24 abutting the isolating sleeve 22 is increased, which prevents the isolating sleeve 22 from being punctured by the abutting component 24. Besides, the bushing 241 comprises an annular stepped surface 2412 inside the bushing 241. The blocker 242 comprises a block end 2421, an annular edge 2422, and a rod end 2423. The block end 2421 is accommodated in the bushing 241. The rod end 2423 selectively extends out of the first shell body 211 and abuts the touch switch 23. Specifically, a gap is formed between the block end 2421 and the plane portion 2411 of the bushing 241 (as shown in FIG. 4) and the block end 2421 comprises a cavity on a surface of the block end 2421, and said surface faces to the plane portion 2411. The annular edge 2422 is formed on an edge of the block end 2421 that is closest to the rod end 2423 and the annular edge 2422 is the broadest portion of the blocker 242. The annular edge 2422 abuts on the annular stepped surface 2412 of the bushing 241. The first shell body 211 comprises a first hole 2113. The rod end 2423 is capable of extending out of the first shell body 211 from the first hole 2113 and abutting the touch switch 23.

The first elastic component 25 is disposed in the first shell body 211 and the bushing 241 and sleeved on the blocker 242. One end of the first elastic component 25 abuts an inner surface of the second end of the first shell body 211, and another end of the first elastic component 25 abuts the blocker 242. Therefore, the first elastic component 25 is connected to the abutting component 24 and thereby the abutting component 24 tends to abut the isolating sleeve 22, so when the touch switch 23 is abutted and pressed by the abutting component 24, the circuit board 26 is activated.

The display assembly 30 and the circuit board 26 of the detecting assembly 20 are electrically connected. Specifically, the detecting assembly 20 and the display assembly 30 are connected by wireless signals or by a cable so that the display assembly 30 and the detecting assembly 20 can be disposed apart from each other. For example, the display assembly 30 can be disposed at a position near the user for the convenience of checking. The display assembly 30 shows different states according to whether the abutting component abuts the touch switch or not. In this embodiment, the display assembly 30 is connected to the detecting assembly 20 by wireless signals and comprises lights for showing the amount of the gas in the gas storage device. Therefore, the display assembly 30 comprises a battery for providing power.

Specifically, the display assembly 30 may comprise three lights, which are a first light 31, a second light 32, and a third light 33. When the first light 31 is on, it represents that the amount of the gas in the gas storage device is sufficient. When the second light 32 is on, it represents that the amount of gas is low or the gas is exhausted and the gas storage device should be replaced. When the third light 33 is on, it represents that power of the battery is low and the battery should be replaced.

Please refer to FIG. 4. The first regulating chamber 110 of the regulating assembly 10 may comprise at least one channel 11, at least one inlet 12, at least one adjusting component 13, at least one second elastic component 14, a shaft 15, a third elastic component 16, a handle 17, and a membrane 18. In this embodiment, the regulating assembly 10 comprises two channels 11, two inlets 12, two adjusting components 13, and two second elastic components 14, making the gas regulator capable of being connected to two gas storage devices, so that one of the gas storage devices provides gas regularly and the other gas storage device is a backup.

A lateral surface of each one of the channels 11 forms a second hole 111. The first regulating chamber 110 communicates with the channels 11 via the second holes 111, each one of the channels 11 communicates with a respective one of the inlets 12, and each one of the inlets 12 communicates with a respective one of the gas storage devices. Each one of the adjusting components 13 is mounted through a respective one of the channels 11 and forms an annular protrusion 131. Each annular protrusion 131 selectively clogs a respective one of the channels 11. Each one of the second elastic components 14 is connected to a respective one of the adjusting components 13 and thereby the annular protrusions 131 of the adjusting components 13 tend to clog the channels 11. In this embodiment, two adjusting components 13 may be distinguished as adjusting components 13a and 13b.

The shaft 15 is capable of moving up and down in the first regulating chamber 110. The shaft 15 comprises a first end and a second end. The first end of the shaft 15 is rotatably disposed in the first regulating chamber 110. The second end of the shaft 15 extends out of the first regulating chamber 110. The first end of the shaft 15 comprises an inclined surface 151. The inclined surface 151 selectively abuts the adjusting components 13. Specifically, as shown in FIG. 4, the adjusting components 13a and 13b selectively abut on two ends of the inclined surface 151 of the shaft 15. For example, the adjusting component 13a abuts the lowest end of the inclined surface 151 and the adjusting component 13b abuts the highest end of the inclined surface 151. In other words, the adjusting components 13a and 13b are located at different height positions. Thus, the adjusting components 13a and 13b makes one of the channels 11 be opened and the other one of the channels 11 be closed.

The third elastic component 16 is connected to the shaft 15 and thereby the inclined surface 151 of the shaft 15 tends to abut the adjusting components 13. The handle 17 is disposed outside the first regulating chamber 110 and connected to the shaft 15 for operating the shaft 15 to rotate. When the shaft 15 is rotated, the inclined surface 151 is rotated accordingly, so that the adjusting component 13a abutting the lowest end of the inclined surface 151 at the beginning is changed to abut the highest end of the inclined surface 151, and the adjusting component 13n abutting the highest end of the inclined surface 151 at the beginning is changed to abut the lowest end of the inclined surface 151.

The membrane 18 is sleeved on the shaft 15 and disposed in the first regulating chamber 110 and thereby the first regulating chamber 110 is divided into two spaces isolated from each other. The shaft 15 further comprises a baffle 152. The baffle 152 is annually formed on an outer surface of shaft 15. An upper surface of the baffle 152 abuts the third elastic component 16 and a lower surface of the baffle 152 abuts the membrane 18. Thus, the pressure in the first regulating chamber 110 transmits to the baffle 152 through the membrane 18, which drives the shaft 15 to withstand the elastic force of the third elastic component 16 and move up and down.

Please refer to FIGS. 1 and 3 to 6. After the gas regulator of the present invention is mounted with two gas storage devices, as shown in FIG. 4, the gas flowing into the first regulating chamber 110 provides sufficient pressure to drive the membrane 18 to move, which causes the two adjusting components 13a and 13b and the shaft 15 to move upward. Meanwhile, the adjusting component 13a keeps abutting the shaft 15 and is further pressed by the shaft 15, so that the corresponding channel 11 is blocked and thereby the corresponding gas storage device is a first gas storage device which is capable of providing gas. However, the adjusting component 13b abuts the shaft 15 but is not pressed down and is capable of clogging the corresponding channel 11, and thereby the corresponding gas storage device is a second gas storage device which does not provide gas.

Figure 5:
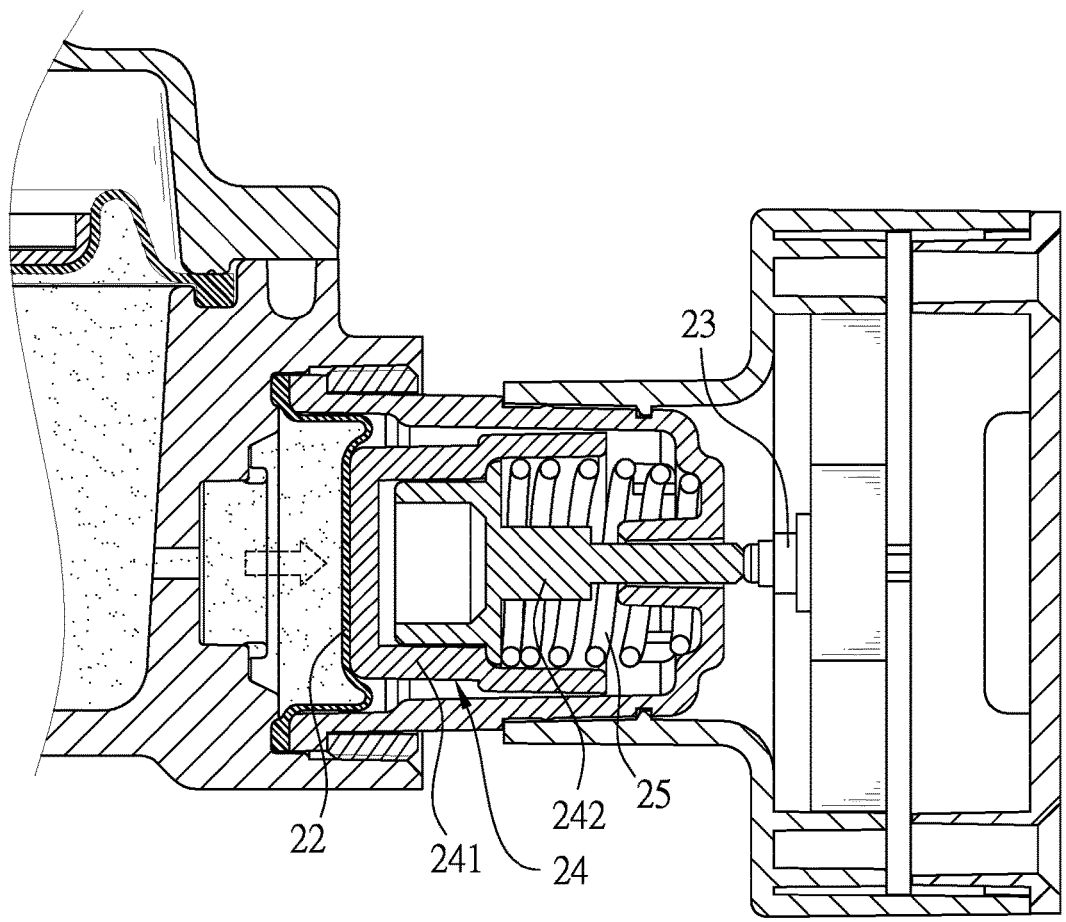
FIG. 5 is an operational sectional view of the detecting assembly of the gas regulator in FIG. 1.

In addition, as shown in FIG. 5, the gas in the first regulating chamber 110 drives the abutting component 24 to abut the isolating sleeve 22 and thus the isolating sleeve 22 abuts and drives the touch switch 23. Furthermore, when the touch switch 23 is pressed by the abutting component 24, the first light 31 of the display assembly 30 is on and shows the gas amount is sufficient.

Figure 6:
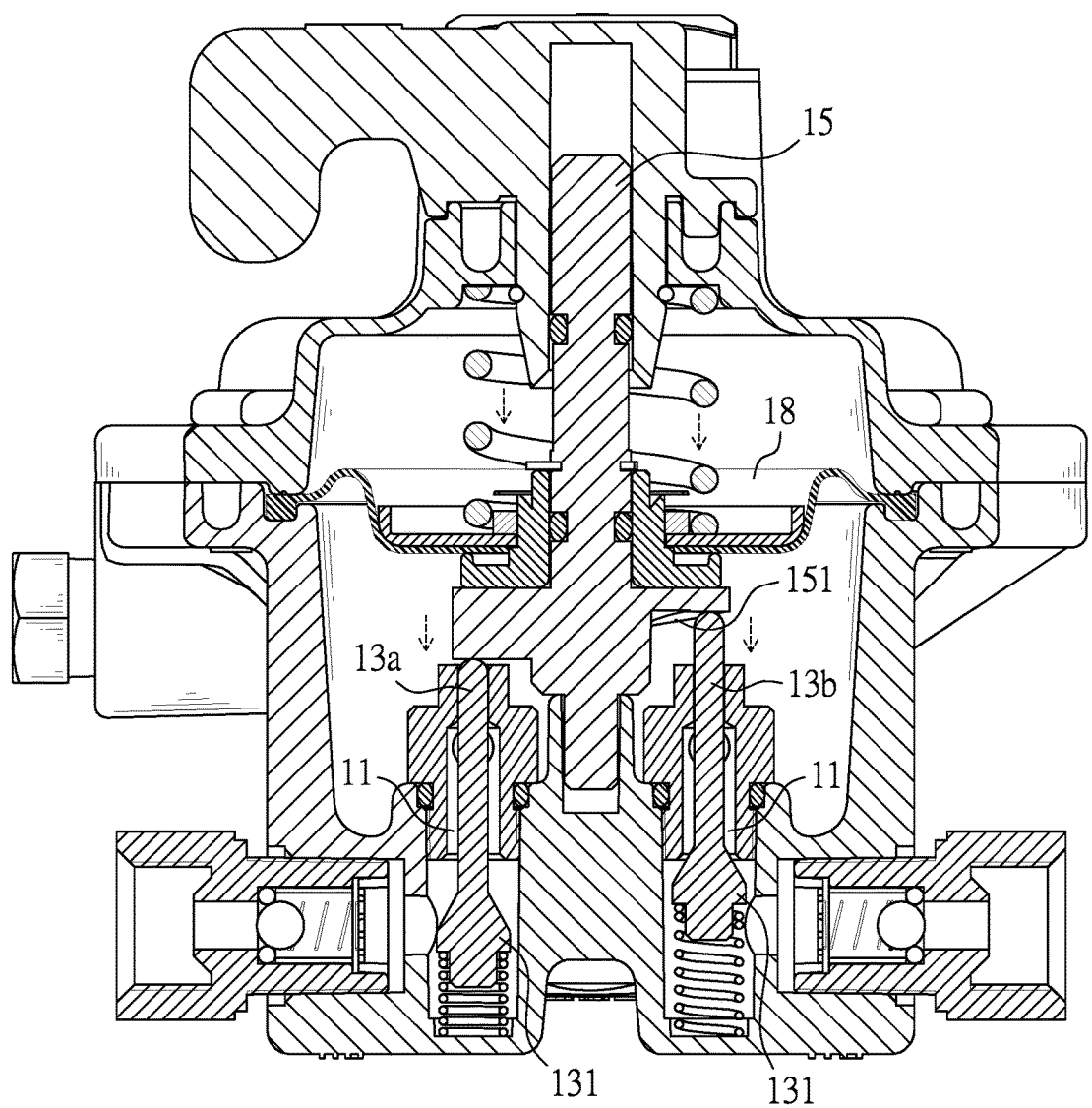
FIG. 6 is an operational sectional view of the regulating chamber of the gas regulator in FIG. 1.

As shown in FIG. 6, with the pressure of the first gas storage device becoming lower, the pressure exerted on the membrane 18 also becomes lower. Therefore, because of the elastic force of the third elastic component 16, the shaft 15 moves downward gradually until the inclined surface 151 of the shaft 15 presses down the adjusting components 13a and 13b at the same time. It represents an amount of the gas in the first gas storage device is low, and after the adjusting component 13b is pressed down, the corresponding channel 11 is opened and the second gas storage device provides gas.

As elastic coefficients of the first elastic component 25, the second elastic component 14, and the third elastic component 16 are well designed, when the pressure in the first regulating chamber 110 is lessened and is not capable of pushing the isolating sleeve 22 and the abutting component 24 to endure the elastic force of the first elastic component 25, the abutting component 24 is pushed away from the touch switch 23 by the first elastic component 25, which causes the adjusting component 13b to move downward and the touch switch 23 is no longer pressed by the abutting component 24 as shown in FIG. 3. Therefore, the first light 31 of the display assembly 30 is off and the second light 32 is on, which represents that the first gas storage device should be replaced. Meanwhile, the pressure in the second gas storage device is restricted to be not capable of driving the abutting component 24, which allows the second light 32 of the display assembly 30 to remain on when the second gas storage device provides gas. However, the first gas storage device may not be replaced at that time, but, after exhaustion, both the gas storage devices are replaced together.

Consequently, with the detecting assembly 20 and the display assembly 30 connected to each other by wireless signals or by a cable but disposed apart from each other, the gas regulator of the present invention is capable of showing the amount of the gas in the gas storage devices. Besides, the regulating assembly 10 and the detecting assembly 20 are capable of being disposed with the gas storage devices at a safe position, and the display assembly 30 is capable of being disposed at a position where the user can observe easily so that the user can check the amount of the gas at any time. In addition, the regulating assembly 10 is capable of being connected to two gas storage devices and, when the first gas storage device is almost exhausted, the regulating assembly 10 automatically turns on the second gas storage device and makes the display assembly 30 display lighting alert. Thus, the user may no longer worry about exhaustion of gas.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A gas regulator being connected to at least one gas storage device, and the gas regulator comprising:
  a regulating assembly comprising:
    a first regulating chamber communicating with the at least one gas storage device to regulate pressure provided by the at least one gas storage device;
  a detecting assembly comprising:
    a shell, one end of the shell securely mounted on the regulating assembly and communicating with the first regulating chamber;
    an isolating sleeve sealing between the end of the shell and the regulating assembly;
    a circuit board disposed in the shell;
    a touch switch disposed in the shell and connected to the circuit board;
    an abutting component disposed in the shell and between the isolating sleeve and the touch switch; the abutting component abutting the isolating sleeve, and selectively abutting the touch switch; and
    a first elastic component disposed in the shell and connected to the abutting component and thereby the abutting component tending to be away from the touch switch; and
  a display assembly disposed apart from the detecting assembly, electrically connected to the detecting assembly wirelessly or by a cable, and being capable of showing an amount of gas in the at least one gas storage device;

wherein the display assembly changes a display state according to whether the abutting component abuts the touch switch or not.

2. The gas regulator as claimed in claim 1, wherein the shell comprises:

a first shell body comprising a first end and a second end, the first end of the first shell body securely mounted on the regulating assembly, communicating with the first regulating chamber, and being sealed by the isolating sleeve; the abutting component and the first elastic component disposed in the first shell body and the abutting component selectively extending out of the first shell body; and a second shell body sleeved with the first shell body; the touch switch disposed in the second shell body.

3. The gas regulator as claimed in claim 2, wherein:

the shell further comprises:

an engaging ring sleeved on the first end of the first shell body and abutting an inner surface of the first regulating chamber;

the first shell body comprises:

a plurality of grooves at the second end of the first shell body; and the second shell body comprises:

a plurality of ribs corresponding to the grooves in position and thereby connected and fixed to each other.

4. The gas regulator as claimed in claim 3, wherein:

the abutting component comprises:

a bushing forming:

a plane portion abutting the isolating sleeve; and a blocker; one end of the blocker accommodated in the bushing; another end of the blocker selectively extending out of the first shell body and selectively abutting the touch switch; and one end of the first elastic component abutting an inner surface of the first shell body; another end of the first elastic component abutting the blocker.

5. The gas regulator as claimed in claim 4, wherein:

the second end of the first shell body forms:

a first hole; and the blocker comprises:

a block end accommodated in the bushing;

a rod end selectively extending out of the first hole of the first shell body and selectively abutting the touch switch; and an annular edge formed on the block end; the annular edge abutting an inner surface of the bushing.

6. The gas regulator as claimed in claim 1, wherein the detecting assembly and the display assembly are connected by wireless signals.

7. The gas regulator as claimed in claim 5, wherein the detecting assembly and the display assembly are connected by wireless signals.

8. The gas regulator as claimed in claim 1, wherein the detecting assembly and the display assembly are connected by a cable.

9. The gas regulator as claimed in claim 5, wherein the detecting assembly and the display assembly are connected by a cable.

10. The gas regulator as claimed in claim 1, wherein the regulating assembly further comprises:

a second regulating chamber communicating with the first regulating chamber to further regulate the pressure provided by the at least one gas storage device.

11. The gas regulator as claimed in claim 7, wherein the regulating assembly further comprises:

a second regulating chamber communicating with the first regulating chamber to further regulate the pressure provided by the at least one gas storage device.

12. The gas regulator as claimed in claim 9, wherein the regulating assembly further comprises:

a second regulating chamber communicating with the first regulating chamber to further regulate the pressure provided by the at least one gas storage device.

13. The gas regulator as claimed in claim 1, wherein the regulating assembly comprises:

at least one channel communicating with the first regulating chamber;

at least one inlet communicating with the at least one channel, each one of the at least one gas storage device communicating with the at least one inlet;

at least one adjusting component movably mounted through the at least one channel and selectively clogging the at least one channel;

at least one second elastic component connected to the at least one adjusting component and thereby the at least one adjusting component tending to clog the at least one channel;

a shaft comprising:

a first end rotatably mounted in the first regulating chamber and forming:

an inclined surface selectively abutting the at least one adjusting component; and a second end extending out of the first regulating chamber;

a third elastic component connected to the shaft and thereby the inclined surface tending to abut the at least one adjusting component;

a handle disposed outside the first regulating chamber and connected to the shaft and thereby the shaft operated by the handle to rotate.

14. The gas regulator as claimed in claim 11, wherein the regulating assembly comprises:

at least one channel communicating with the first regulating chamber;

at least one inlet communicating with the at least one channel, each one of the at least one gas storage device communicating with the at least one inlet;

at least one adjusting component movably mounted through the at least one channel and selectively clogging the at least one channel;

at least one second elastic component connected to the at least one adjusting component and thereby the at least one adjusting component tending to clog the at least one channel;

a shaft comprising:

a first end rotatably mounted in the first regulating chamber and forming:

an inclined surface selectively abutting the at least one adjusting component; and a second end extending out of the first regulating chamber;

a third elastic component connected to the shaft and thereby the inclined surface tending to abut the at least one adjusting component;

a handle disposed outside the first regulating chamber and connected to the shaft and thereby the shaft operated by the handle to rotate.

15. The gas regulator as claimed in claim 12, wherein the regulating assembly comprises:
- at least one channel communicating with the first regulating chamber;
- at least one inlet communicating with the at least one channel, each one of the at least one gas storage device communicating with the at least one inlet;
- at least one adjusting component movably mounted through the at least one channel and selectively clogging the at least one channel;
- at least one second elastic component connected to the at least one adjusting component and thereby the at least one adjusting component tending to clog the at least one channel;
- a shaft comprising:
  - a first end rotatably mounted in the first regulating chamber and forming:
    - an inclined surface selectively abutting the at least one adjusting component; and
  - a second end extending out of the first regulating chamber;
- a third elastic component connected to the shaft and thereby the inclined surface tending to abut the at least one adjusting component;
- a handle disposed outside the first regulating chamber and connected to the shaft and thereby the shaft operated by the handle to rotate.

16. The gas regulator as claimed in claim 13, wherein numbers of each one of the at least one channel, the at least one inlet, the at least one adjusting component, and the at least one second elastic component of the regulating assembly are two and thereby the gas regulator is capable of being connected to two gas storage devices; the two adjusting components selectively and respectively abut two ends of the inclined surface of the shaft.

17. The gas regulator as claimed in claim 14, wherein numbers of each one of the at least one channel, the at least one inlet, the at least one adjusting component, and the at least one second elastic component of the regulating assembly are two and thereby the gas regulator is capable of being connected to two gas storage devices; the two adjusting components selectively and respectively abut two ends of the inclined surface of the shaft.

18. The gas regulator as claimed in claim 15, wherein numbers of each one of the at least one channel, the at least one inlet, the at least one adjusting component, and the at least one second elastic component of the regulating assembly are two and thereby the gas regulator is capable of being connected to two gas storage devices; the two adjusting components selectively and respectively abut two ends of the inclined surface of the shaft.

* * * * *